United States Patent [19]
Dietrich

[11] Patent Number: 5,419,927
[45] Date of Patent: May 30, 1995

[54] PROCESS FOR COATING FIBER REINFORCED CERAMIC COMPOSITES

[75] Inventor: Herbert Dietrich, New City, N.Y.

[73] Assignee: Chromalloy Gas Turbine Corporation, Orangeburg, N.Y.

[21] Appl. No.: 248,646

[22] Filed: Sep. 26, 1988

[51] Int. Cl.$^6$ .............................. B05D 3/04
[52] U.S. Cl. ........................... 427/309; 427/534; 428/408
[58] Field of Search .................. 427/98, 309, 534; 428/408

[56] References Cited

U.S. PATENT DOCUMENTS

| | | | |
|---|---|---|---|
| 3,249,460 | 5/1966 | Gerry | 117/70 |
| 3,398,033 | 8/1968 | Haga et al. | 156/17 |
| 3,465,421 | 9/1969 | Chappel et al. | 29/494 |
| 3,607,473 | 9/1971 | Grunwald et al. | 156/2 |
| 3,808,087 | 4/1974 | Milewski et al. | 161/72 |
| 3,879,238 | 4/1975 | Bierman et al. | 156/3 |
| 4,081,121 | 3/1978 | Picard | 228/181 |
| 4,086,128 | 4/1978 | Sugio et al. | 156/668 |
| 4,098,450 | 7/1978 | Keller et al. | 228/119 |
| 4,188,237 | 2/1980 | Chasteen | 134/2 |
| 4,321,298 | 3/1982 | Shaffer et al. | 428/242 |
| 4,397,901 | 8/1983 | Warren | 428/101 |
| 4,405,685 | 9/1983 | Honjo et al. | 428/368 |
| 4,409,048 | 10/1983 | Hatch et al. | 156/155 |
| 4,415,406 | 11/1983 | Wiggins | 156/668 |
| 4,425,407 | 1/1984 | Galasso et al. | 428/368 |
| 4,455,207 | 6/1984 | Sartor et al. | 204/192 E |
| 4,472,476 | 9/1984 | Veltri et al. | 428/215 |
| 4,476,164 | 10/1984 | Veltri et al. | 427/249 |
| 4,476,178 | 10/1984 | Veltri et al. | 428/215 |
| 4,485,179 | 11/1984 | Brennan et al. | 501/32 |
| 4,515,860 | 5/1985 | Hoizi | 428/408 |
| 4,605,479 | 9/1986 | Faith, Jr. | 204/192 D |
| 4,615,763 | 10/1986 | Gelorme et al. | 156/643 |
| 4,647,477 | 3/1987 | DeLuca | 427/309 X |

*Primary Examiner*—Peter A. Nelson
*Attorney, Agent, or Firm*—Mitchell D. Bittman

[57] ABSTRACT

A process is disclosed for coating fiber reinforced ceramic composites which has particular application for high temperature resistant composite materials for use in applications such as the aerospace industry. The process involves etching the surface to be coated with an etchant to expose the fiber in the ceramic composite while leaving the fiber intact and bound to the ceramic composite, followed by coating the etched surface with a coating composition.

16 Claims, No Drawings

PROCESS FOR COATING FIBER REINFORCED CERAMIC COMPOSITES

BACKGROUND OF THE COMPOSITION

This invention relates to coating ceramic materials and more particularly to coating a fiber reinforced ceramic composite in which the adhesion of the coating to the ceramic composite is greatly improved, and to the coated ceramic composite thus produced.

The use of ceramic materials of monolithic or composite construction is common where high temperatures (e.g. 1000° C. or higher) are encountered. Such ceramic materials are used in many applications in the aerospace industry including gas turbine parts, air frame components, rocket engine components, etc.

Major difficulties have been encountered with coating of ceramic materials. Proper adhesion of the coating to the ceramic can be difficult because stresses which develop due to varying degrees of thermal expansion of the ceramic and the coating. As a result, especially in high temperature applications, cracking of the coating frequently occurs allowing oxidation and a corrosive attack on the ceramic substrate. In addition, mechanical vibrations and other forms of physical stress or even debris damage may cause cracking and spalling of the protective coating layer if proper adhesion of the coating to the ceramic is not achieved.

Various attempts have been made in the art to relieve the foregoing problems associated with thermal expansion mismatch. Among the solutions includes coating the ceramic with an oxygen scavenging sealant layer to provide protection or a gradient in the thermal coefficient of expansion from the ceramic substrate to the outer oxidation resistant coating. A carbon body with an oxidation resistant coating is disclosed in U.S. Pat. No. 4,515,860 in which a coating is formed of a silicon alloy having a non-columnar grain distribution.

It is also well known in the art to clean various superalloys with different types of fluorides as is disclosed in U.S. Pat. Nos. 4,188,237 and 4,098,450. The art also discloses the cleaning or etching of various nonmetallic materials such as U.S. Pat. No. 3398033 which discloses etching a silicon surface with chlorine and oxygen, U.S. Pat. No. 3,465,421 which discloses cleaning a germanium surface and U.S. Pat. Nos. 3,607,473, 3,879,238 and 4,415,406 which disclose etching of a polymer article followed by metallizing or coating with a paint or adhesive. U.S. Pat. No. 4,615,763 discloses etching a fiber reinforced epoxy resin, with the etching only to roughen the surface, followed by coating with an adhesive then plating with copper or nickel in a desired pattern for use as a circuit breaker.

It is an object of this invention to provide a coating for a fiber reinforced ceramic composite.

It is another object of this invention to provide a coating with improved adhesion to the substrate of a fiber reinforced ceramic composite.

SUMMARY OF THE INVENTION

Briefly, this invention provides a process for coating a fiber reinforced ceramic composite and a product produced thereby comprising etching the surface to be coated with an etchant at a temperature and for a period of time effective to expose the fiber in the ceramic composite while leaving the fiber intact and bound to the ceramic composite, followed by coating the etched surface of the ceramic composite with a protective coating composition. The surface preparation of the fiber reinforced ceramic composite greatly enhances the adhesion of the coating to the substrate, substantially decreasing the tendency for the coating to delaminate and greatly improving the oxidation protective performance of the coating.

DETAILED DESCRIPTION OF THE INVENTION

The process of this invention coats a fiber reinforced ceramic composite. Various types of fibers and matrices can be employed in the ceramic composite. Of particular interest are the high temperature fiber reinforced composites which include fibers such as carbon, silicon carbide and alumina-boria-silicate with matrices such as carbon, boron carbide, silicon carbide, silicon nitride, and boron nitride as well as lower temperature matrix materials such as epoxy resins and polyimide resins. Examples of such fibers, matrices and fiber reinforced composites can be found in U.S. Pat. Nos. 4321291, 4405685, 4409048, 4476164, 4425407, 4472476, 4476178 and 4485179.

The fiber reinforced ceramic composite is etched in accordance with this invention at a temperature and for a period of time effective to expose the fiber in the ceramic composite while leaving the fiber intact and bound to the ceramic composite. This degree of etching is important to the resultant coated composite to achieve the adhesion and prevent delamination of the coating during subsequent use, especially in high temperature applications in which the coated composite will undergo numerous temperature cycles. Too little etching and removal of the matrix material will result in only marginal improvement of the coating adhesion as compared to no etching whatsoever and will generally be insufficient to counteract the tendency for the coating to delaminate from the substrate during thermal cycling. Over etching while possibly providing improved adhesion may adversely affect the structural integrity of the composite by removing too much matrix material or by physically attacking the reinforcing fibers. In general the proper degree of etching will result in the removal of matrix material to the depth of between 0.5 to 10 mils leaving the surface fibers standing alone, but intact and bound to the underlying fiber/matrix structure. The network of thus exposed fibers produced by the etching provides an anchoring mechanism for the subsequent coating that is to be deposited. In the subsequent coating, the coating composition fills up the spaces between and around the fibers providing an improved anchoring mechanism for the coating.

Various liquid and gaseous agents may be used to etch a ceramic composite such as chromic acid, sulfuric acid, peroxides, persulfates, nitric acid, boric acid, carboxylic acid, carbon monoxide, carbon dioxide etc. However the particular etchant and the temperature, time and other conditions for etching the ceramic composite is chosen to selectively remove the ceramic matrix material while leaving the fiber intact and bound to the ceramic composite. An active gaseous atmosphere, in particular where the gaseous atmosphere is either chlorine, hydrogen and hydrogen fluoride, or hydrogen and the thermal decomposition product of a fluorocarbon resin is the preferred etchant because of the ability of the etchant to selectively remove the matrix ceramic material. The preferred gaseous atmosphere is hydrogen and hydrogen fluoride with etching preferably being carried out at temperatures in the range from 750° to 1200° C. for ⅛ to 20 hours at atmosphere pressure.

Following etching of the fiber reinforced ceramic composite a coating is applied to the etched surface. Various types of coatings can be applied to the composite substrate including metallic, ceramic and mixtures of metals and ceramics. The selection of the coating is based primarily upon the subsequent use of the coated composite and is selected based on the consideration of factors such as thermal expansion coefficients (comparative to the substrate), chemical compatibility, thickness, operating temperatures, oxidation resistance, emissivity, reflectivity and longevity. Examples of coatings that can be applied include ceramic coatings such as silicon carbide, silicon nitride, boron carbide and titanium carbide, metallic coatings which contain molybdenum, silicon, titanium and iridium, as well as mixtures of metallics and ceramics such as a mixture of aluminum oxide and nickel or a mixture of molybdenum and cordierite or a mixture of titanium carbide and iridium. Examples of such coatings can be found in U.S. Pat. Nos. 3249460, 4321298, 4425407, 4472476, 4476164, 4476178 and 4515860.

The high temperature gas etching with hydrogen and hydrogen fluoride can also be used to partially or completely remove previously applied coatings, including chemically vapor deposited coatings such as silicon carbide applied to carbon/carbon substrates. This capability of the process is useful for removing defective coatings without damaging the underlying substrate, or for improving the adhesion between multi-layer coatings applied sequentially.

EXAMPLE #1

A reinforced carbon fiber composite was fabricated from a high modulus, high strength polyacrylonitrile based carbon fiber lightly inhibited with boron (approx. 10%) and densified with a combination of pitch and resin. Several small two dimensional reinforced carbon fiber (2-D carbon/carbon) coupons approximately 1"×3"×0.2" with excess pyrolyzed resin densification char remaining on the surfaces machined from the panel were processed in a mixture of flowing hydrogen and hydrogen fluoride gases. Furnace temperature was maintained at 1000° C. Gas flows were: HF 20SCFH (standard cubic feet/hour), H₂ 180SCFH. Processing time at 1000° C. with both hydrogen and hydrogen fluoride gases flowing was 4 hours. Total pressure was 770 mm. Flowing argon (20SCFH) was used during heat up from room temperature and during cool down to purge residual oxygen and etchant gases.

Examination of the coupons after processing indicated that the shiny surface char had been extensively removed uniformly exposing surface fibers. Some residual densification material remained in depressions at intersection of perpendicular yarn bundles. Thickness decrease was measured to be approximately 5 mils.

Subsequently, a coating of 10–15 mils of silicon rich silicon carbide (85% Si, remainder carbon) was applied to the etched coupon. Examination revealed no delamination or spalling.

EXAMPLE #2

A large rib stiffened 2-D carbon/carbon (as in Example #1) panel, approximately 18"×24"×3" high with excess resin densification char was processed under the same conditions as in Example #1. After processing, visual examination indicated uniform removal of char material and exposure of the underlying fiber-matrix structure. Thickness reduction was in the 5 to 10 mil range.

A coating of 10–15 mils of silicon rich (85% Si) silicon carbide was then applied to the etched panel without incurring coating spallation or delamination.

EXAMPLE #3

Several ¾"×3"×0.25" 2-D carbon/carbon coupons with residual pyrolytic carbon densification scale remaining on the surface were processed under the following conditions: gas flows were hydrogen fluoride 30 SCFH and hydrogen 170 SCFH; processing time at 1000° C. was a total of 8 hours; and total pressure was 770 mm. Flowing argon gas at 20 SCFH was used during heat up and cool down for purging the reaction chamber and exhaust lines.

The same coating as described in Examples #1 was applied without incurring spalling or delamination.

EXAMPLE #4

A 2-D carbon/carbon panel as described in Example #2 was previously coated with 5–8 mils of silicon rich (85% Si) silicon carbide. After visual examination determined that the coating was defective and contained isolated delaminations, the panel was subjected to multiple exposures of flowing hydrogen and hydrogen fluoride gas under the conditions described in Example #1. After four exposures, the defective coating was entirely removed leaving the composite surface free of coating material and exposing the carbon fibers to a depth of 1 to 5 mils.

The panel was subsequently re-coated as in Example #2 without incurring coating spallation or delamination.

What is claimed is:

1. Process for coating a fiber reinforced ceramic composite comprising:
    etching the surface to be coated of a fiber reinforced ceramic composite with an etchant at a temperature and for a time effective to expose the fiber in the ceramic composite while leaving the fiber intact and bound to the ceramic composite; and coating the etched surface of the ceramic composite with a coating composition.

2. Process of claim 1 wherein the ceramic composite contains a matrix material chosen from the group consisting of carbon, silicon carbide, silicon nitride, boron nitride, epoxy resins and polyimide resins.

3. Process of claim 2 wherein the fiber is chosen from the group consisting of carbon, silicon carbide and alumina-boria-silicate.

4. Process of claim 3 wherein the surface of the ceramic composite is etched to a depth of about 0.5 to 10 mils.

5. Process of claim 4 wherein the etchant is an active gaseous atmosphere.

6. Process of claim 5 wherein the active gaseous atmosphere is chosen from the group consisting of chlorine, hydrogen and hydrogen fluoride, and hydrogen and the thermal decomposition product of a fluorocarbon resin.

7. Process of claim 6 wherein the coating composition contains a ceramic.

8. Process of claim 7 wherein the ceramic coating composition is chosen from the group consisting of silicon carbide, boron carbide, titanium carbide, silicon nitride and combinations thereof.

9. Process of claim 6 wherein the coating composition contains a metal.

10. Process of claim 9 wherein the metal coating composition is chosen from the group consisting of molybdenum, silicon, titanium and iridium.

11. Process of claim 6 wherein the coating composition is a mixture of metal and ceramic.

12. Process of claim 11 wherein the coating composition is chosen from the group consisting of aluminum oxide and nickel, molybdenum and cordierite, and titanium carbide and iridium.

13. Process of claim 6 wherein the ceramic matrix material is a high temperature resistant material selected from the group consisting of carbon, boron carbide, silicon carbide and silicon nitride and the etchant is an active gaseous atmosphere containing hydrogen and hydrogen fluoride.

14. Process of claim 13 wherein the etching is carried out at temperatures in the range of 750°–1200° C. for ½ to 20 hours.

15. Process as in claims 1, 3, 6 or 14 wherein the etching additionally removes a previously applied coating.

16. A coated fiber reinforced ceramic composite prepared by the process as in claims 1, 3, 6, 7, 9 or 13.

* * * * *